(12) United States Patent
Long

(10) Patent No.: US 11,300,172 B2
(45) Date of Patent: Apr. 12, 2022

(54) LOAD LIMITING BREAKAWAY DEVICE

(71) Applicant: Lockheed Martin Corporation, Bethesda, MD (US)

(72) Inventor: Timothy R. Long, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 92 days.

(21) Appl. No.: 16/776,142

(22) Filed: Jan. 29, 2020

(65) Prior Publication Data

US 2021/0231188 A1 Jul. 29, 2021

(51) Int. Cl.
| F16F 9/34 | (2006.01) |
| F16F 9/02 | (2006.01) |
| F16F 9/32 | (2006.01) |

(52) U.S. Cl.
CPC .......... *F16F 9/0209* (2013.01); *F16F 9/3214* (2013.01); *F16F 9/34* (2013.01)

(58) Field of Classification Search
CPC .......... F16F 9/34; B60G 17/08; B60G 17/044
USPC .............................. 188/315; 267/64.11–64.19
See application file for complete search history.

(56) References Cited

U.S. PATENT DOCUMENTS

| 2,379,388 A | 6/1945 | Thornhill | |
| 2,946,582 A * | 7/1960 | Martin | B60G 17/044 |
| | | | 267/64.19 |
| 3,379,430 A | 4/1968 | Hennells | |
| 4,306,638 A * | 12/1981 | Malott | B60G 3/01 |
| | | | 188/315 |
| 4,550,899 A | 11/1985 | Holley | |
| 4,702,463 A | 10/1987 | Krautkrämer | |
| 5,522,486 A * | 6/1996 | Fulks | F16F 9/34 |
| | | | 188/286 |
| 5,823,512 A * | 10/1998 | Oyaizu | F16F 9/0218 |
| | | | 267/64.12 |
| 5,885,061 A * | 3/1999 | Olofsson | F04B 5/02 |
| | | | 417/260 |
| 5,887,857 A | 3/1999 | Perrin | |
| 5,961,102 A | 10/1999 | Oyaizu | |
| 5,971,117 A | 10/1999 | Grundei et al. | |
| 6,092,816 A * | 7/2000 | Sekine | B60G 17/0152 |
| | | | 267/64.17 |
| 6,098,966 A | 8/2000 | Latvis et al. | |
| 6,213,261 B1 | 4/2001 | Kunkel | |
| 6,237,904 B1 | 5/2001 | Shepherd | |
| 6,309,264 B1 | 10/2001 | Saito | |
| 6,648,308 B2 * | 11/2003 | Gunnar Rothoff | B60G 17/044 |
| | | | 267/64.17 |
| 6,938,887 B2 * | 9/2005 | Achenbach | B60G 17/08 |
| | | | 188/315 |

(Continued)

*Primary Examiner* — Christopher P Schwartz
(74) *Attorney, Agent, or Firm* — Baker Botts L.L.P.

(57) ABSTRACT

A system includes a first cylinder. The first cylinder includes a first piston mounted in the first cylinder and a first channel formed in an inner wall of the first cylinder. The first cylinder is configured to hold a pressurized gas. The system further comprises a second cylinder surrounding the first cylinder. The second cylinder comprises a second piston mounted in the second cylinder. The second piston is configured to surround the first cylinder. The second cylinder further comprises a second channel formed in the inner wall of the second cylinder. The second cylinder is configured to hold a pressurized gas. The system further includes one or more seals coupled to the first and second pistons.

16 Claims, 5 Drawing Sheets

(56) References Cited

U.S. PATENT DOCUMENTS

| | | | |
|---|---|---|---|
| 7,823,803 B2 | 11/2010 | Peterson et al. | |
| 10,081,408 B2 | 9/2018 | Yoshida | |
| 10,422,403 B2 * | 9/2019 | Ellifson | F16F 9/3214 |
| 2005/0016803 A1 | 1/2005 | Brummitt | |
| 2005/0274583 A1 | 12/2005 | Hewel et al. | |
| 2015/0115563 A1 * | 4/2015 | Marking | B60G 15/12 |
| | | | 280/124.158 |
| 2018/0003257 A1 | 1/2018 | Knol | |

* cited by examiner

LOAD LIMITING BREAKAWAY DEVICE

TECHNICAL FIELD

This disclosure relates in general to actuated mechanisms and more particularly to a load limiting breakaway device.

BACKGROUND

Certain mechanism designs involve linkages that are on-center or nearly on-center. In some instances, greater-than-average loads may be seen in these areas. Damage, such as breakage or bending, can occur to a mechanism or to attaching structures due to the high mechanical advantage created by on-center linkages. The mechanism can be damaged or destroyed by the high loads generated. Current techniques and tools for preventing damage to actuated mechanisms may be limited.

SUMMARY OF THE DISCLOSURE

According to one embodiment, a system includes a first cylinder. The first cylinder includes a first piston mounted in the first cylinder and a first channel formed in an inner wall of the first cylinder. The first cylinder is configured to hold a pressurized gas. The system further comprises a second cylinder surrounding the first cylinder. The second cylinder comprises a second piston mounted in the second cylinder. The second piston is configured to surround the first cylinder. The second cylinder further comprises a second channel formed in the inner wall of the second cylinder. The second cylinder is configured to hold a pressurized gas. The system further includes one or more seals coupled to the first and second pistons.

According to one embodiment, a method comprises mounting a first piston in a first cylinder. The first cylinder is configured to hold a pressurized gas. The method also includes forming a first channel in an inner wall of the first cylinder and mounting a second piston to surround the first cylinder. The method further includes mounting the second piston within a second cylinder. The second cylinder is configured to hold a pressurized gas. Lastly, the method includes forming a second channel in an inner wall of the second cylinder and coupling one or more seals to the first and second pistons.

According to one embodiment, a system includes a first cylinder. The first cylinder includes a first piston mounted in the first cylinder. The first piston is coupled to an output shaft. The first cylinder further includes a first channel formed in an inner wall of the first cylinder. A first valve is coupled to the first cylinder. The system further includes a second cylinder surrounding the first cylinder. The second cylinder includes a second piston mounted in the second cylinder. The second piston surrounds the first cylinder and is coupled to an output shaft. The second piston further includes a second channel formed in an inner wall of the second cylinder. A second valve is coupled to the second piston. The system further includes one or more seals coupled to the first and second pistons.

Technical advantages of certain embodiments may include protecting a mechanism from damage due to high loads created by the on-center linkage system. Further advantages include providing time to respond to and relieve a mechanism from an unexpectedly high load without the mechanism being subjected to immediate damage and providing an operator with the ability to increase or decrease the amount of load that the system can manage by changing the pressure of the compressed gas. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Figure 1A:
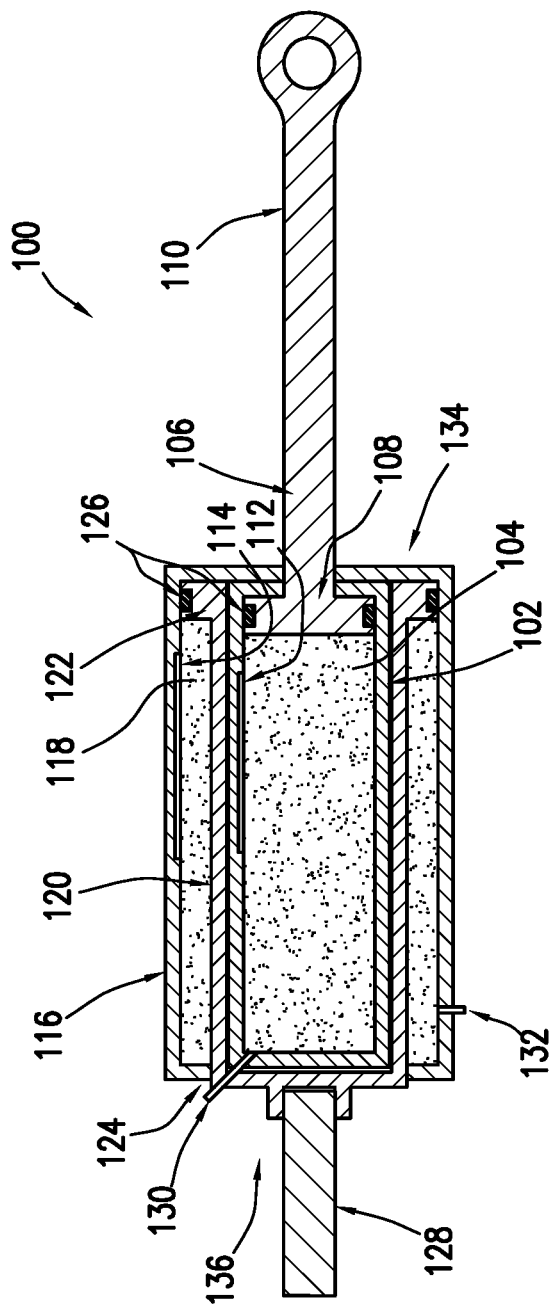
FIG. 1A illustrates an interior view of a system for limiting force in a mechanism with the first and second pistons in a preloaded configuration, according to certain embodiments.

When a mechanism is subjected to a load that is greater than its normal operating load, such as when actuation delivers a maximum stall load or when a mechanism jam occurs, the mechanism or attaching structures may suffer severe damage. To prevent damage to a mechanism or to its attaching structures, a protective system is needed. When protecting mechanisms from loads that are greater than the normal operating load, traditional techniques of absorbing damaging forces include using shock absorbing assemblies such as springs. Although devices that absorb shock may allow for the absorption of forces that are higher than a normal operating load, they do not allow for the transmission of normal operating loads through a stiff load path. When subjected to normal operating forces, devices, such as springs, may move instead of serving as a rigid components of the overall mechanism, which would prevent accurate positioning of the mechanism. Accordingly, a device that is configured to both provide a stiff load path at normal operating loads and to break free and protect the mechanism from becoming damaged when the load becomes too great may be desirable.

The teachings of this disclosure recognize the use of a device that not only acts as a normal, rigid piece of a mechanism at normal loads, but that also breaks free and acts to limit force in a mechanism for a specified amount of piston stroke when a certain breakaway force is exceeded.

Using such device may result in various benefits, including, but not limited to, being able to protect a mechanism from damage due to high loads created by the on-center linkage system. Further advantages include preventing the mechanism from being subjected to immediate damage. Because the device may limit the force in the mechanism for the time that it takes the piston to stroke, an operator may have time to act in response to relieve the mechanism from an unexpectedly high load before damage occurs. Additionally, such a device may be associated with benefits such as providing an operator with the ability to increase or decrease the amount of load that the system can manage by changing the pressure of the compressed gas. The following describes systems and methods of a load limiting breakaway device for providing these and other desired features.

FIGS. 1A-E illustrate system 100 for limiting force in a mechanism, according to certain embodiments. In some embodiments, system 100 includes cylinder 102 filled with pressurized gas 104, piston 106 with piston head 108 and output shaft 110, channel 112, valve 130, cylinder 116 filled with pressurized gas 118, piston 120 with piston head 122 and output shaft 128, channel 114, valve 130, and one or more seals 126.

In general, system 100 may comprise piston 106 mounted in cylinder 102, and piston 120 surrounding cylinder 102 and being mounted in cylinder 116. Specifically, system 100 may be configured to act as a normal, rigid piece of the mechanism at normal operating loads. Then, when the mechanism is subjected to high loads above a certain breakaway force, as illustrated by compressive force 144 or tensile force 152, system 100 may protect the mechanism from damage by allowing either piston 106 or piston 120 to break away from first end 134 and stroke towards second end 136 through pressurized gas 104 within cylinder 102 or pressurized gas 118 within cylinder 116, respectively.

FIG. 1A illustrates a cross-sectional view of system 100 for limiting force in a mechanism with pistons 106 and 120 in a preloaded configuration, according to certain embodiments. In some embodiments, piston head 108 of piston 106 and piston head 122 of piston 120 may be preloaded against first end 134 of cylinder 102 and cylinder 116 by columns of pressurized gas 104 and pressurized gas 118, respectively. In the preloaded configuration, system 100 may allow for the transmission of normal operating loads through a stiff load path comprised of its structural components.

In some embodiments, cylinder 102 and cylinder 116 may be configured to hold pressurized gas. Cylinder 102 and cylinder 116 may have a circular cross section, in some embodiments. In certain embodiments, cylinder 102 and cylinder 116 may have a square cross section, triangular cross section, or a cross section of any other shape. Cylinder 102 may have a cross-section shape that is the same as the cross-section shape of cylinder 116. In some embodiments, cylinder 102 may have a different cross-section shape from cylinder 116. Cylinder 102 and cylinder 116 may be comprised of steel, aluminum, another metal or alloy, or any other material or mixture of materials that can withstand both the external loads applied to system 100 during operation and the force of pressurized gas 104 and pressurized gas 118 contained within the cylinders, respectively. The material or materials comprising cylinder 102 and cylinder 116 may be of any thickness sufficient to withstand both the external loads applied to system 100 during operation and the force of pressurized gas 104 and pressurized gas 118 contained within the cylinders, respectively. In certain embodiments, cylinder 102 and cylinder 116 may be comprised of the same material. In some embodiments, cylinder 102 and cylinder 116 may be comprised of different materials. In some embodiments, the length and diameter of cylinder 116 may be greater than the length and diameter of cylinder 102. In certain embodiments, the length and diameter of cylinder 116 may be sufficiently sized so that cylinder 116 may completely or partially enclose cylinder 102. The lengths of cylinder 102 and cylinder 116 may be dependent on the amount of desired stroke for piston 106 and piston 120, respectively. The diameters of cylinder 102 and cylinder 116 may be dependent on the diameters of piston 106 and piston 120. The effect of these diameters on the amount of load that system 100 can withstand before breaking away from the preloaded configuration will be explained further below in reference to FIGS. 1B and 1D.

In some embodiments, cylinder 102 may be at least partially contained within cylinder 116. In certain embodiments, cylinder 102 contacts and may be coupled to cylinder 116 at first end 134 of system 100. Cylinder 102 may be longer than or have a length equal to the length of cylinder 116, in some embodiments. In certain embodiments, cylinder 102 may have a length that is equivalent or nearly equivalent to the length of the interior space of cylinder 116.

Pressurized gas 104 and pressurized gas 118, in some embodiments, may be any inert gas or any mixture of inert gasses. In some embodiments, pressurized gas 104 and 118 may be a non-corrosive gas or any mixture of non-corrosive gasses, such as, but not limited to, nitrogen, helium, or hydrogen. Pressurized gas 104 and 118 may be oxygen in certain embodiments. Furthermore, pressurized gas 104 and pressurized gas 118 may be compressed air. In some embodiments, pressurized gas 104 and pressurized gas 118 may be the same type of gas, different type of gas, or any combination of suitable gasses. Pressurized gas 104 and 118 may be compressed within cylinder 102 and/or cylinder 116 to a pound-force per square inch (PSI) above the ambient atmospheric pressure. For example, but not by way of limitation, the PSI of pressurized gas 104 and/or pressurized gas 118 may range from 100 to 1500 PSI. The PSI of pressurized gas 104 and pressurized gas 118 may be any pressure that can be safely contained by cylinder 102 and/or cylinder 116. As discussed below, in some embodiments, the PSI of pressurized gas 104 and pressurized gas 118 may be determined by the amount of load that system 100 is needed to withstand before breaking away from the preloaded configuration.

In some embodiments, piston 106 may be slidably mounted within cylinder 102. Piston 106 may include piston head 108 and output shaft 110. Piston 106 may be comprised of steel, aluminum, another metal or alloy, or any other material or mixture of materials that can withstand both the external loads applied to output shaft 110 during operation and the force of pressurized gas 104 on piston head 108 without bending and/or breaking. Furthermore, the material or materials comprising piston 106 may be of any thickness sufficient to withstand both the external loads applied to output shaft 110 during operation and the force of pressurized gas 104 on piston head 108 without bending and/or breaking. In certain embodiments, output shaft 110 and piston head 108 may be formed from a single piece of material. Output shaft 110 may be a separate component that is coupled to piston head 108 by an adhesive, a joint, or any other suitable means of coupling, in some embodiments. In certain embodiments, piston 106 may have a constant inner diameter. Piston head 108 may have a larger diameter than output shaft 110, in some embodiments. In certain embodiments, piston head 108 may have the same shape as the cross section of cylinder 102. For example, in some embodiments, cylinder 102 may have a circular cross section and piston head 108 may be circular (e.g., as in FIG. 2). In some embodiments, the diameter of piston head 108 may be any value within the range of one inch to one foot in diameter. The diameter of piston head 108 may be smaller than the diameter of cylinder 102, such that piston head 108 may slidably mount within the interior of cylinder 102. The desired amount of load that system 100 can withstand before breaking away from the preloaded configuration may depend on the diameter of piston head 108. This will be explained further below in reference to FIG. 1B.

In certain embodiments, output shaft 110 may have an end with a suitable connection for coupling system 100 to any other mechanism component. Output shaft 110 may have a length greater than the length of cylinder 102, in some embodiments. The length of cylinder 102 and the length of output shaft 110 may determine the amount of stroke of piston 106. The relationship between the length of cylinder 102 and the load limiting aspect of system 100 will be discussed below in reference to FIG. 1C.

In some embodiments, piston 120 may be slidably mounted within cylinder 116. In certain embodiments, piston 120 may also be slidably mounted around cylinder 102. Piston 120 may include piston head 122 and output shaft 128. Piston 120 may be comprised of steel, aluminum, another metal or alloy, or any other material or mixture of materials that can withstand both the external loads applied to output shaft 128 during operation and the force of pressurized gas 118 on piston head 108 without bending and/or breaking. Furthermore, the material or materials comprising piston 120 may be of any thickness sufficient to withstand both the external loads applied to output shaft 128 during operation and the force of pressurized gas 118 on piston head 122 without bending and/or breaking. In certain embodiments, piston 106 and piston 120 may be comprised of the same material. In some embodiments, piston 106 and piston 120 may be comprised of different materials. In certain embodiments, output shaft 128 and piston head 122 may be formed from a single piece of material. Output shaft 128 may be a separate component that is coupled to piston head 122 by an adhesive, a joint, or any other suitable means of coupling, in some embodiments. In certain embodiments, output shaft 128 may have an end with a suitable connection for coupling system 100 to any other mechanism component.

In certain embodiments, the outer rim of piston head 122 may have the same shape as the cross section of cylinder 116. For example, in some embodiments, cylinder 116 may have a circular cross section and piston head 122 may be circular. In some embodiments, if the cross section of cylinder 102 is a different shape than the cross section of cylinder 116, piston 120 may have an outer rim with a first shape and an inner rim with a second shape, so that it may slidably mount between the two cylinders. In some embodiments, the outer diameter of piston head 122 may be any value within the range of one inch to one foot in diameter. The diameter of piston head 122 may be smaller than the diameter of cylinder 116, such that piston head 122 may be slidably mounted within cylinder 116. The diameter of piston head 122 may be greater than the diameter for cylinder 102, so that piston head 122 may be slidably mounted around cylinder 102. The inner diameter of piston 120 may closely match the outer diameter of cylinder 102. The desired amount of load that system 100 can withstand before breaking away from the preloaded configuration may depend on the diameter of piston head 122. This will be explained further below in reference to FIGS. 1B and 1D.

Piston 120 may have a length greater than the length of cylinder 116, in some embodiments. In certain embodiments, piston 120 may have a length that is equal to or longer than cylinder 116. The length of cylinder 116 may determine the amount of stroke of piston 120. The relationship between the length of cylinder 116 and the load limiting aspect of system 100 will be discussed below in reference to FIG. 1E.

By having more than one piston, load may be limited in two opposing directions, such as from a compressive load or a tensile load on the device. Although FIGS. 1A-E show an arrangement of system 100 that would correspond with using piston 106 as a compression relieving piston and piston 120 as a tension relieving piston, system 100 may be comprised of an outer piston that may be used to relieve compression and an inner piston that may be used to relieve tension, and thus the embodiment shown in FIGS. 1A-E should not be construed as limiting. Furthermore, in some embodiments, system 100 may not have a piston 120, cylinder 116, or value 132, so the embodiment shown in FIG. 1-A should not be construed as limiting system 100 to a two-piston construction.

In some embodiments, seals 126 are coupled to piston 106 and to piston 120. Seals 126 may be operable to keep gas pressure from leaking from one side of a piston to the other side when the piston is not within the area of channels 112 and 114, as explained below in reference to FIG. 1B. Seals 126 may be comprised of nitrile rubber, thermoplastic polyurethane, acetal, Viton, EPDM rubber, polytetrafluoroethylene, or any other material that is suitable to prevent the leakage of gas. Seals 126 may contact the inner walls of cylinder 120 and cylinder 102. In some embodiments, there may be one seal 126 on piston head 108 and on piston head 122. In some embodiments, piston head 108 may have a different number of seals 126 than piston head 122. Piston head 108 and piston head 122 may each have more than one seal 126. In some embodiments, seals 126 may be comprised of piston rings, which may surround piston head 108 and/or piston head 122. Seals 126 surrounding piston head 108 and piston head 122 may have different diameters. Seals 126 may be in any form that is suitable to prevent the leakage of gas. Piston head 108 may be coupled to a different type of seal than piston head 122, in some embodiments.

In some embodiments, channel 112 and channel 114 may be formed in the inner walls of cylinder 102 and cylinder 116, respectively. Channel 112 and channel 114 may be configured to allow the passage of gas from one side of cylinder head 108 or cylinder head 122 to the other side, towards first end 134 of system 100. Channel 112 and channel 114 may be formed by creating a space in the molds of cylinder 102 and cylinder 116, in some embodiments. In certain embodiments, channel 112 and channel 114 may be formed by drilling channels into the inner walls of cylinder 102 and cylinder 116. Channel 112 and channel 114 may be located anywhere along the inner walls of cylinder 102 and cylinder 116, respectively. For example, channel 112 and channel 114 may be located nearer to first end 134 of system 100, as depicted in FIGS. 1A-E. In some embodiments, channel 112 and channel 114 may be located nearer to second end 136 of system 100. In some embodiments, channel 112 and channel 114 may have a length that is greater than the thickness of piston head 108 and piston head 122, respectively. Channel 112 and channel 114 may have any length that is sufficient to allow air to pass from a first side of the piston to the second side of the piston. Channel 112 may be in a different location and/or may have a different length than channel 114, in certain embodiments. In some embodiments, channel 112 may be in the same location and/or may have the same length as channel 114. Although FIGS. 1A-E show a single channel 112 and a single channel 114, system 100 may be comprised of one or more channels 112 and/or one or more channels 114, and thus the embodiment shown in FIGS. 1A-E should not be construed as limiting. The operation of channel 112 and channel 114 will be explained further below in reference to FIGS. 1B and 1D.

In some embodiments, valve 130 and valve 132 may be configured to allow cylinder 102 and cylinder 116 to be pressurized with gas. Valve 130 and valve 132 may be configured of a metal, metal alloy, a plated metal or metal alloy, or any material sufficient to allow pressurized gas to be pumped into a chamber. Valve 130 and valve 132 may have valve caps, in some embodiments. In certain embodiments, valve 130 and valve 132 may be equipped with interior seals. Valve 130 may pass through an and of cylinder 102 and an end of piston 120 to reach pressurized gas 104, in some embodiments. Valve 130 may be located in any position that allows it to reach pressurized gas 104 when system 100 is in a preloaded configuration. For example, valve 130 may pass through an end of cylinder 102 and an end of cylinder 116 to reach pressurized gas 104. Furthermore, valve 130 may pass through a wall of cylinder 102 and cylinder 116 to reach pressurized gas 104. Valve 132 may be located in any position that allows it to reach pressurized gas 118 when system 100 is in a preloaded configuration. For example, valve 132 may pass through an end of cylinder 116 to reach pressurized gas 104. Furthermore, valve 132 may pass through a wall of cylinder 116 reach pressurized gas 104. Although FIGS. 1A-E show a single valve 130 and a single valve 132, system 100 may be comprised of one or more valves 130 and/or one or more valves 132, and thus the embodiment shown in FIGS. 1A-E should not be construed as limiting. By including valve 130 and valve 132 in system 100, the pressure of pressurized gas 104 and pressurized gas 118 may be increased or decreased by a third-party (e.g., manufacturer, user, or maintenance group) to accommodate different loads that system 100 may be subjected to. The ability to change the load that system 100 can withstand may allow system 100 to be used in a wider variety of contexts.

In operation, system 100 may be configured to act as a normal, rigid piece of the mechanism at normal operating loads. In some embodiments, piston head 108 of piston 106 and piston head 122 of piston 120 may be preloaded against first end 134 of cylinder 102 and cylinder 116 by columns of pressurized gas 104 and pressurized gas 118, respectively. When set in a preloaded configuration, a stiff load transfer path may pass through system 100. For example, with reference to FIG. 1A, load may pass into output shaft 110 of piston 106, may then pass through the walls of cylinder 102, cylinder 116, and piston 120, and may lastly pass from output shaft 128 of piston 120. In some embodiments, piston head 108 and piston head 122 may remain against the hard stop of first end 134 of system 100 due to the force of pressurized gas 104 and pressurized gas 118, respectively. This may cause system 100 to act as a rigid piece of the overall mechanism.

Figure 1B:
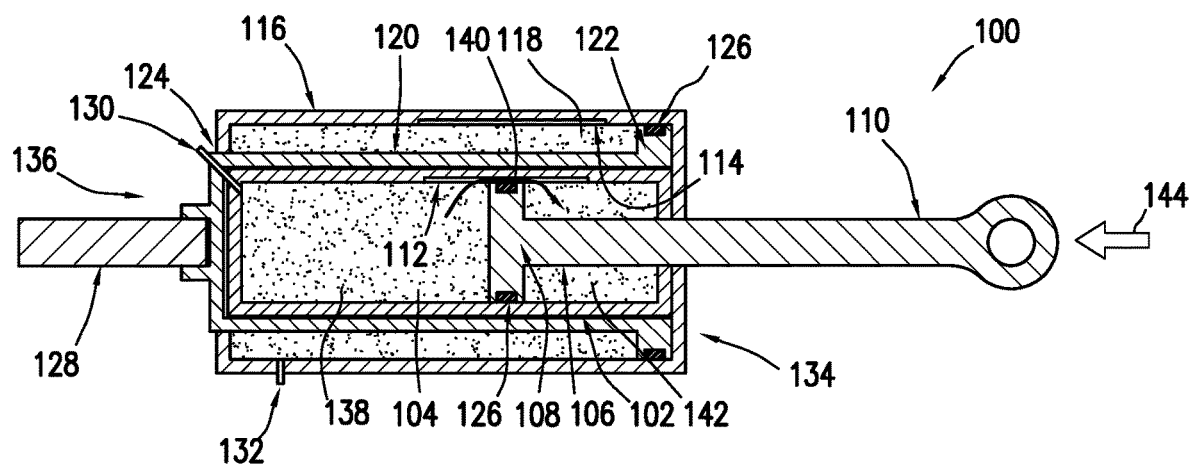
FIG. 1B illustrates an interior view of the system of FIG. 1A with a first piston in a broken-away configuration and gas moving through a first channel, according to certain embodiments.

FIG. 1B illustrates a piston 106 in a broken-away configuration and pressurized gas 104 moving along path 140 through channel 112, according to certain embodiments. In general, when the mechanism is subjected to high loads above a certain compressive force 144, system 100 may protect the mechanism from damage by allowing piston 106 to break away from first end 134 and stroke within cylinder 102 towards second end 136.

In operation, when compressive force 144 reaches a certain breakaway force, piston 106 may overcome the force imparted by pressurized gas 104 acting on the exposed portion of piston head 108. Output shaft 110 of piston 106 may begin to stroke in response to compressive force 144, causing motion to be absorbed within system 100. When this breakaway occurs, in some embodiments, system 100 may no longer act rigid and/or provide a stiff load transfer path. In some embodiments, the breakaway force at which piston 106 may begin to move may be determined by the diameter of piston head 108 and the pressure of pressurized gas 104. The desired breakaway force may be determined by the product of the amount of piston 106 area that is exposed to pressurized gas 104 and the gas pressure difference on either side of the piston. Therefore, a larger diameter piston head 108 or a greater initial gas pressure of pressurized gas 104 may cause the force needed to cause a breakaway of system 100 to be higher. For example, in an embodiment with piston head 108 having two square inches of area and cylinder 102 containing pressurized gas 104 at one thousand PSI, two thousand pounds of force would need to be applied before piston 106 would break away from first end 134. Therefore, in some embodiments, a third party (e.g., manufacturer, user, or maintenance group) may set the desired breakaway force—at which system 100 may no longer be completely rigid—by filling cylinder 102 with pressurized gas 104 to a certain PSI. In some embodiments, valve 130 may be used to pressurize first cylinder 102, as described above. The ability to change the load that system 100 can withstand may allow system 100 to be used in a wider variety of contexts.

In certain embodiments, pressurized gas 104 may become increasingly compressed as piston head 108, which may be coupled to one or more seals 126, moves into cylinder 102. Therefore, the load on output shaft 110 may increase as piston 106 travels into cylinder 102.

In some embodiments, piston head 108 may reach channel 112. When piston head 108 and one or more seals 126 cross completely into channel 112, channel 112 may allow path 140 for pressurized gas 104 to escape around one or more seals 126 and move from first side 138 towards second side 142 and first end 134 of system 100. In certain embodiments, channel 112 may allow the pressure of pressurized gas 104 to equalize on both sides 138 and 142 of piston head 108 within cylinder 102, which may cause the load on output shaft 110 to drop to zero. At this point, piston 106 may be moved within cylinder 102 with little to no force.

In some embodiments, piston head 108 may pass channel 112 as it moves towards second end 136 of system 100. When piston head 108 and one or more seals 126 completely pass beyond channel 112, pressurized gas 104 may begin to become compressed within the remaining area of cylinder 102 beyond the end of channel 112. This may provide a load on output shaft 110 and may allow some amount of load transfer through system 100.

Figure 1C:
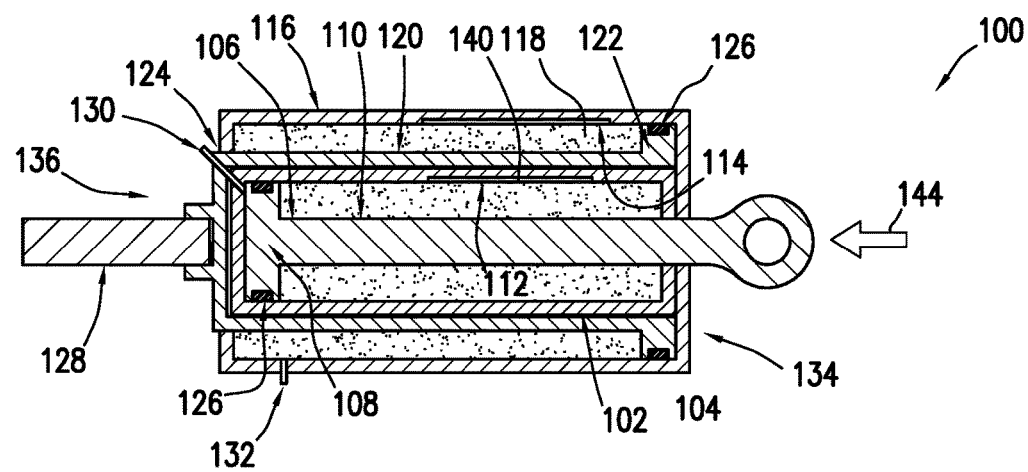
FIG. 1C illustrates an interior view of the system of FIG. 1A with a first piston in a completely stroked configuration, according to certain embodiments.

FIG. 1C illustrates piston 106 in a completely stroked configuration, according to certain embodiments. In some embodiments, after passing channel 112, piston 106 may overcome the force imparted by the remaining pressurized gas 104 acting on the exposed portion of piston head 108 and may travel to second end 136 of system 100. When piston head 108 travels the length of cylinder 102 and reaches the hard stop at second end 136, a stiff load transfer path is created. Damage to the mechanism may occur at this point. Therefore, system 100 may limit load and prevent damage by compressive force 144 until piston 106 reaches the completely stroked configuration. The length of cylinder 102 and output shaft 110 may determine the amount of stroke of piston 106, and thus the amount of load-limiting protection that system 100 may provide. In certain embodiments, valve 130 may be used to re-pressurize cylinder 102 after piston 106 is returned to its original preloaded position at first end 134 of system 100.

Figure 1D:
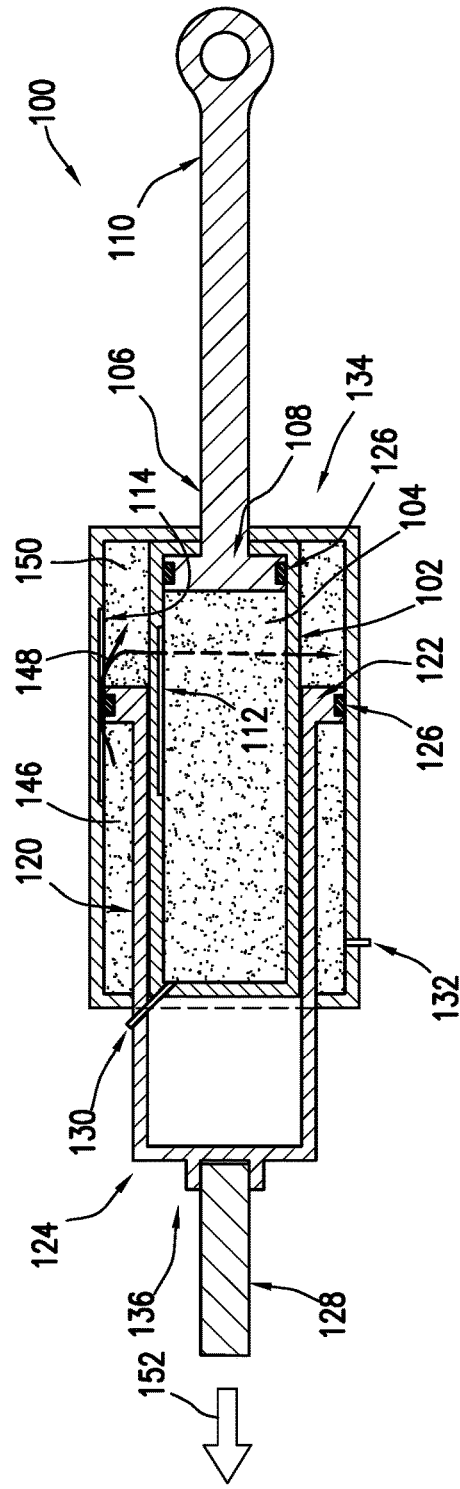
FIG. 1D illustrates an interior view of the system of FIG. 1A with a second piston in a broken-away configuration and gas moving through a second channel, according to certain embodiments.

FIG. 1D illustrates piston 120 in a broken-away configuration and pressurized gas 118 moving through channel 114, according to certain embodiments. In general, when the mechanism is subjected to high loads above a certain tensile force 152, system 100 may protect the mechanism from damage by allowing piston 120 to break away from first end 134 and stroke within cylinder 116 towards second end 136.

In operation, when tensile force 152 reaches a certain breakaway force, piston 120 may overcome the force imparted by pressurized gas 118 acting on the exposed portion of piston head 122. Output shaft 128 of piston 120 may begin to stroke in response to tensile force 152, causing motion to be absorbed within system 100. When this breakaway occurs, in some embodiments, system 100 may no longer act rigid and/or provide a stiff load transfer path. In some embodiments, the breakaway force at which piston 120 may begin to move may be determined by the diameter of piston head 122 and the pressure of pressurized gas 118. The desired breakaway force may be determined by the product of the amount of piston 120 area that is exposed to pressurized gas 118 and the gas pressure difference on either side of the piston. Therefore, a larger diameter piston head 122 or a greater initial gas pressure of pressurized gas 118 may cause the force needed to cause a breakaway of system 100 to be higher. For example, in an embodiment with piston head 122 having two square inches of area and cylinder 116 containing pressurized gas 118 at one thousand PSI, two thousand pounds of force would need to be applied before piston 120 would break away from first end 134. Therefore, in some embodiments, a third party (e.g., manufacturer, user, or maintenance group) may set the desired breakaway force—at which system 100 may no longer be completely rigid—by filling cylinder 116 with pressurized gas 118 to a certain PSI. In some embodiments, valve 132 may be used to pressurize cylinder 116, as described above. The ability to change the load that system 100 can withstand may allow system 100 to be used in a wider variety of contexts.

In certain embodiments, pressurized gas 118 may become increasingly compressed as piston head 122, which may be coupled to one or more seals 126, moves into cylinder 116. Therefore, the load on output shaft 128 may increase as piston 120 travels into cylinder 116.

In some embodiments, piston head 122 may reach channel 114. When piston head 122 and one or more seals 126 cross completely into channel 114, channel 114 may allow path 148 for pressurized gas 118 to escape around one or more seals 126 and move from first side 146 towards second side 150 and first end 134 of system 100. In certain embodiments, channel 114 may allow the pressure of pressurized gas 118 to equalize on both sides 146 and 150 of piston head 122 within cylinder 116, which may cause the load on output shaft 128 to drop to zero. At this point, piston 120 may be moved within cylinder 116 with little to no force.

In some embodiments, piston head 122 may pass channel 114 as it moves towards second end 136 of system 100. When piston head 122 and one or more seals 126 completely pass beyond channel 114, pressurized gas 118 may begin to become compressed within the remaining area of cylinder 116 beyond the end of channel 114. This may provide a load on output shaft 128 and may allow some amount of load transfer through system 100.

Figure 1E:
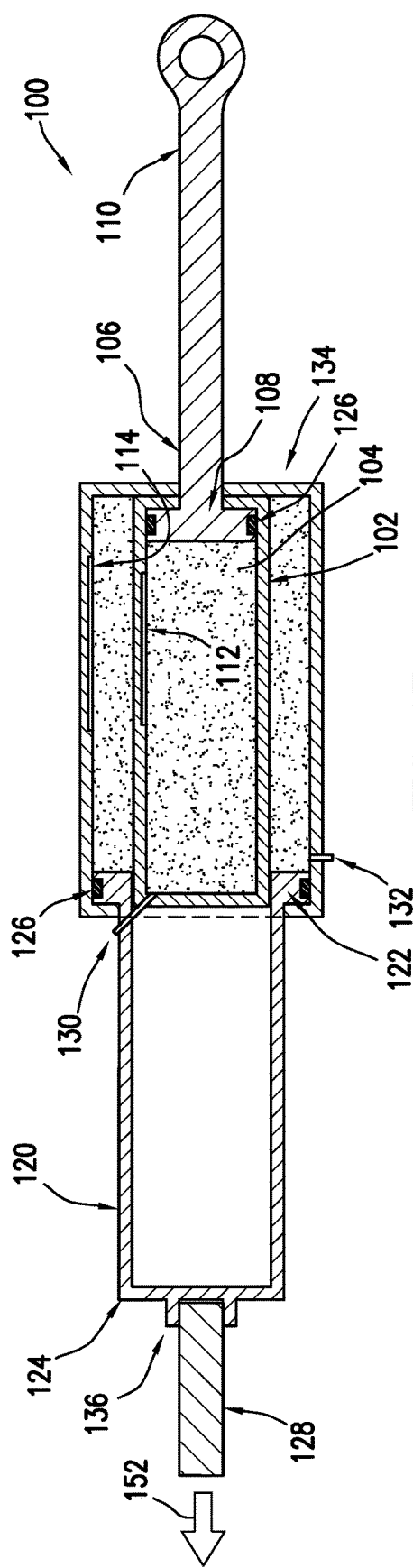
FIG. 1E illustrates an interior view of the system of FIG. 1A with a second piston in a completely stroked configuration, according to certain embodiments.

FIG. 1E illustrates piston 120 in a completely stroked configuration, according to certain embodiments. In some embodiments, when piston head 122 travels the length of cylinder 116 and reaches the hard stop at second end 136, a stiff load transfer path is created. Damage to the mechanism may occur at this point. Therefore, system 100 may limit load and prevent damage by tensile force 152 until piston 120 reaches the completely stroked configuration. The length of cylinder 116 and piston 120 may determine the amount of stroke of piston 120, and thus the amount of load-limiting protection that system 100 may provide. In certain embodiments, valve 132 may be used to re-pressurize cylinder 116 after piston 120 is returned to its original preloaded position at first end 134 of system 100.

Modifications, additions, or omissions may be made to the systems described herein without departing from the scope of the invention. For example, system 100 may include any number of valves, seals, pistons, or cylinders. The components may be integrated or separated. Moreover, the operations may be performed by more, fewer, or other components.

Figure 2:
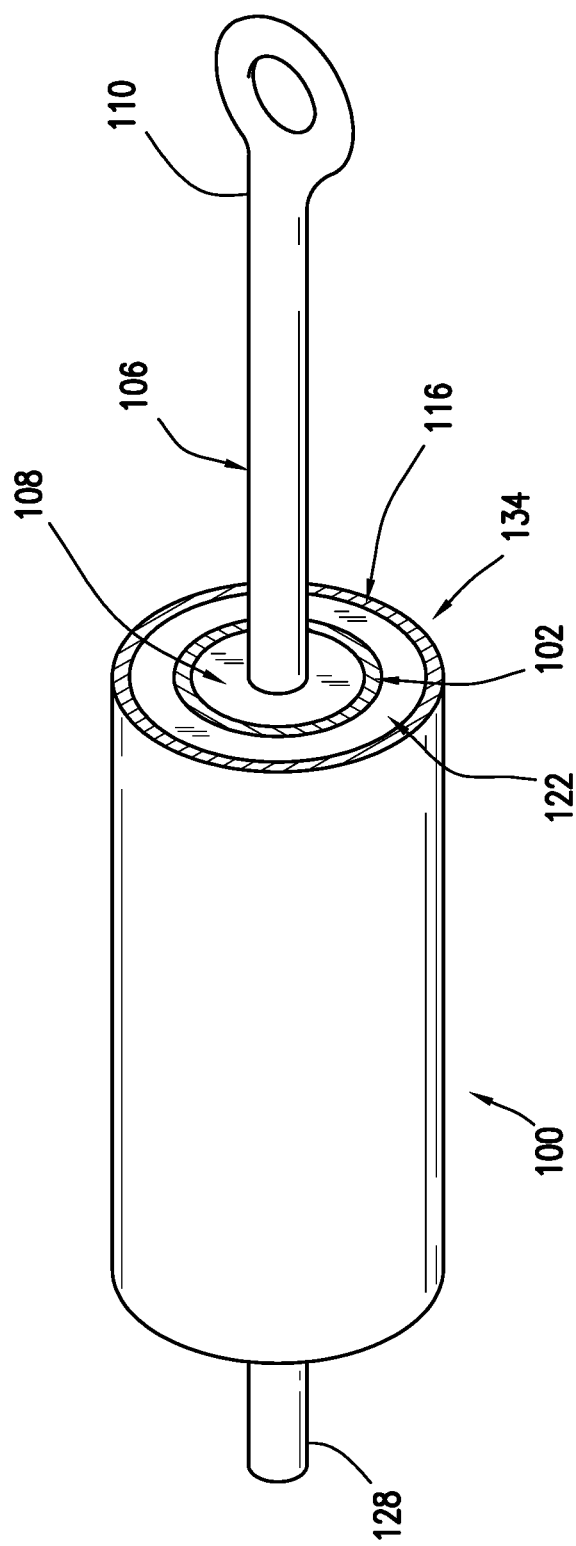
FIG. 2 illustrates an isometric view of the system of FIG. 1A in a preloaded configuration, according to certain embodiments.

FIG. 2 illustrates an isometric view of system 100 of FIG. 1A in a preloaded configuration, according to certain embodiments. FIG. 2 illustrates an example of system 100, which may comprise a piston 106 having piston head 108 and output shaft 110, a cylinder 102, a piston 120 having piston head 122 and output shaft 128, and a cylinder 116. As described above in reference to FIG. 1A, piston head 108 and piston head 122 may be preloaded against first end 134 of the cylinders (not shown).

In some embodiments, as explained above, the pistons and cylinders of assembly 200 may be in a nested configuration. In certain embodiments, the diameter of piston head 108 may be of a sufficient value to slidably mount within cylinder 102. The diameter of piston head 122 may be of a sufficient value to be slidably mounted around cylinder 102 and slidably mounted within cylinder 116. In some embodiments, the inner diameter of piston head 122 may closely match the outer diameter of cylinder 102. The surface area of piston head 108 may be equivalent to the surface area of piston head 122, in some embodiments.

Modifications, additions, or omissions may be made to the systems described herein without departing from the scope of the invention. For example, system 100 may include any number of cylinders or pistons. The components may be integrated or separated. Moreover, the operations may be performed by more, fewer, or other components.

Figure 3:
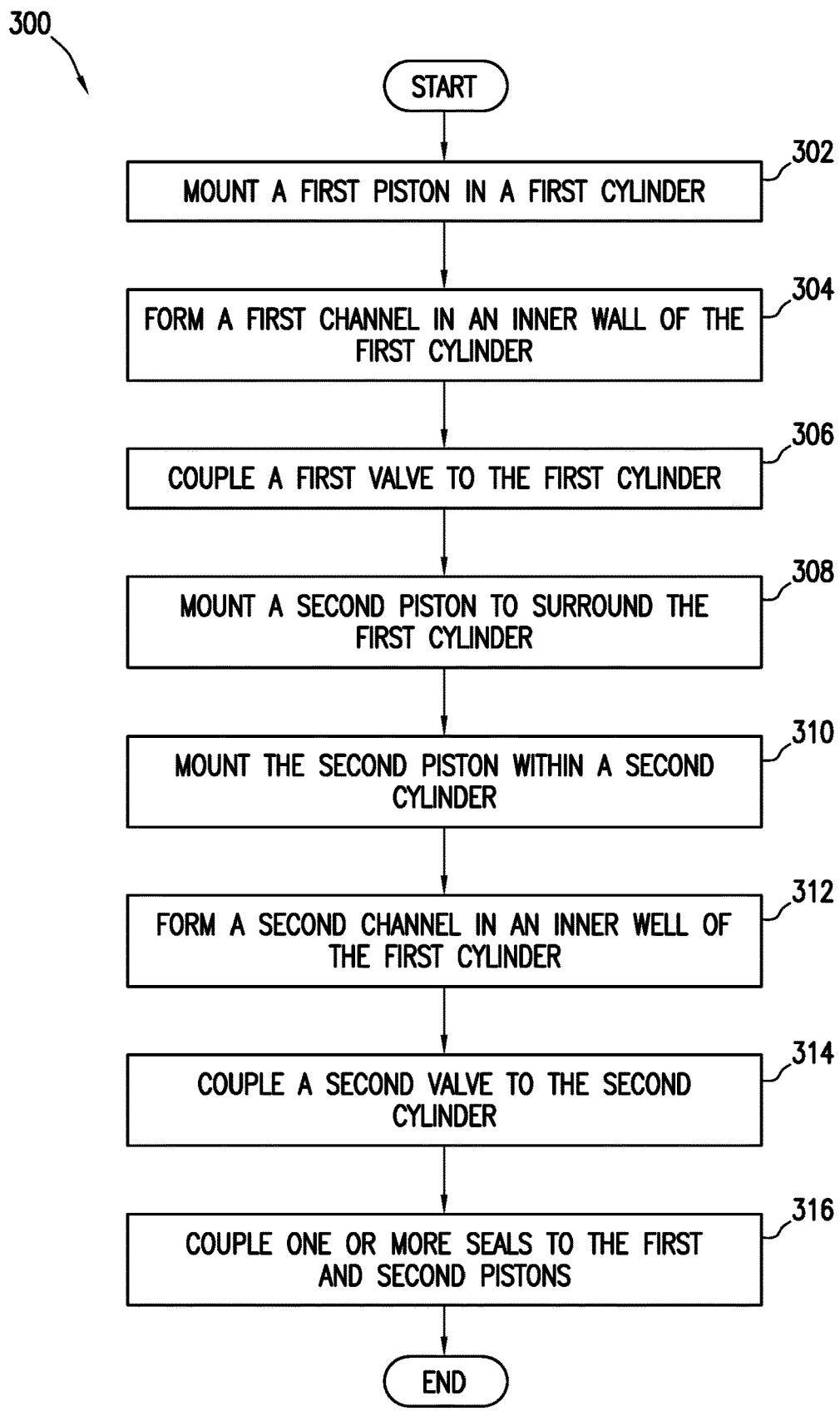
FIG. 3 is a flow chart illustrating a method for limiting force in a mechanism with the system of FIG. 1, according to certain embodiments.

FIG. 3 illustrates an example method 300 for limiting force in a mechanism with example system 100 system of FIG. 1, according to certain embodiments.

Method 300 begins at step 302, in some embodiments, during which a first piston 106 is mounted in a first cylinder 102. By mounting piston 106 within first cylinder 102, first piston 106 may be able to slide within first cylinder 102, in some embodiments.

At step 304, in some embodiments, a first channel 112 is formed in an inner wall of cylinder 102. First channel 112 may be formed by creating a space in the mold of cylinder 102, in some embodiments. In certain embodiments, first channel 112 may be formed by drilling a channel into the inner wall of cylinder 102.

At step 306, first valve 130 is coupled to first cylinder 102, in some embodiments. In some embodiments, first valve 130 may pass through both first cylinder 102 and second cylinder 116. In some embodiments, first valve 130 may pass through both second piston 120 and first cylinder 102. By coupling first valve 130 to first cylinder 102, pressurized gas 104 may be pumped through first valve 130 into the interior of first cylinder 102 during manufacturing and/or before use by a third-party operator, among other situations.

At step 308, second piston 120 may be mounted to surround first cylinder 102. In some embodiments, second piston 120 may be able to slide around first cylinder 102.

At step 310, second piston 120 is mounted within second cylinder 116. By mounting second piston 120 within second cylinder 116, second piston 120 may be able to slide within second cylinder 116 and round first cylinder 102, in some embodiments.

At step 312, in some embodiments, a second channel 114 is formed in an inner wall of second cylinder 116. Second channel 114 may be formed by creating a space in the mold of second cylinder 116, in some embodiments. In certain embodiments, second channel 114 may be formed by drilling a channel into the inner wall of second cylinder 116.

At step 314, second valve 132 is coupled to second cylinder 116, in some embodiments. By coupling second valve 132 to second cylinder 116, pressurized gas 118 may be pumped through second valve 132 into the interior of second cylinder 116 during manufacturing and/or before use by a third-party operator, among other situations.

At step 316, one or more seals 126 may be coupled to piston 106 and/or second piston 120. Seals 126 may be coupled to piston 106 and/or second piston 120 by adhesive, in some embodiments. In certain embodiments, one or more seals 126 may be piston rings that are fit into grooves on piston head 108 and/or piston head 122. By coupling seals 126 to piston 106 and/or second piston 120, pressurized gas 104 or pressurized gas 118 may become increasingly compressed as first piston head 106 or piston head 122 moves into first cylinder 102 or second cylinder 116. After this, the method ends.

Modifications, additions, or omissions may be made to method 300 described herein without departing from the scope of the invention. The steps may be combined, modified, or deleted where appropriate, and additional steps may be added. For example, more than one channel may be formed at steps 304 and 312. Additionally, the steps may be performed in any suitable order without departing from the scope of the present disclosure. While discussed as various components of system 100 performing the steps, any suitable component or combination of components of system 100 may perform one or more steps of the method.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system, comprising:
a first cylinder configured to hold pressurized gas, the first cylinder comprising:
a first piston mounted in the first cylinder, the first piston comprising a first piston head that slidably contacts an inner wall of the first cylinder; and
a first channel formed in the inner wall of the first cylinder, the first channel configured to allow the passage of pressurized gas from one side of the first piston head within the first cylinder to an opposite side of the first piston head within the first cylinder;
a second piston surrounding the first cylinder, the second piston slidably mounted in a second cylinder, the second cylinder configured to hold pressurized gas, the second piston comprising a second piston head that slidably contacts an inner wall of the second cylinder, the second cylinder comprising:
a second channel formed in the inner wall of the second cylinder, the second channel configured to allow the passage of pressurized gas from one side of the second piston head within the second cylinder to an opposite side of the second piston head within the second cylinder; and
one or more seals coupled to the first and second piston heads.

2. The system of claim 1, wherein the one or more seals are piston rings.

3. The system of claim 1, wherein the pressurized gas is a non-corrosive gas.

4. The system of claim 1, wherein the pressurized gas is nitrogen.

5. The system of claim 1, wherein the second piston is coupled to an output shaft.

6. The system of claim 1, wherein the system further comprises one or more valves coupled to the first and second cylinders.

7. The system of claim 1, wherein a length of the first piston is greater than a length of the first cylinder.

8. The system of claim 1, further comprising:
a first output shaft coupled to the first piston; and
a second output shaft coupled to the second piston, wherein the first and second output shafts extend away from opposite ends of the system.

9. A method comprising:
slidably mounting a first piston in a first cylinder, wherein the first cylinder is configured to hold pressurized gas and wherein the first piston comprises a first piston head that slidably contacts an inner wall of the first cylinder;
forming a first channel in the inner wall of the first cylinder, the first channel configured to allow the passage of pressurized gas from one side of the first piston head within the first cylinder to an opposite side of the first piston head within the first cylinder;
mounting a second piston to surround the first cylinder;
slidably mounting the second piston within a second cylinder, the second piston comprising a second piston head that slidably contacts an inner wall of the second cylinder, wherein the second cylinder is configured to hold pressurized gas;

forming a second channel in an inner wall of the second cylinder, the second channel configured to allow the passage of pressurized gas from one side of the second piston head within the second cylinder to an opposite side of the second piston head within the second cylinder; and coupling one or more seals to the first and second piston heads.

10. The method of claim 9, wherein the one or more seals are piston rings.

11. The method of claim 9, wherein the pressurized gas is a non-corrosive gas.

12. The method of claim 9, wherein the pressurized gas is nitrogen.

13. The method of claim 9, further comprising coupling the second piston to an output shaft.

14. The method of claim 9, further comprising coupling one or more valves to the first and second cylinders.

15. The method of claim 9, wherein a length of the first piston is greater than a length of the first cylinder.

16. A system comprising:

a first cylinder configured to hold pressurized gas, the first cylinder comprising:

a first piston slidably mounted in the first cylinder, the first piston comprising a first piston head that slidably contacts an inner wall of the first cylinder;

a first channel formed in an inner wall of the first cylinder, the first channel configured to allow the passage of pressurized as from one side of the first piston head within the first cylinder to an opposite side of the first piston head within the first cylinder; and a first valve coupled to the first cylinder;

a second piston surrounding the first cylinder, the second piston slidably mounted in a second cylinder, the second cylinder configured to hold pressurized gas, the second piston comprising a second piston head that slidably contacts an inner wall of the second cylinder, the second cylinder comprising:

a second channel formed in an inner wall of the second cylinder, the second channel configured to allow the passage of pressurized gas from one side of the second piston head within the second cylinder to an opposite side of the second piston head within the second cylinder; and a second valve coupled to the second piston; one or more seals coupled to the first and second piston heads;

a first output shaft coupled to the first piston; and a second output shaft coupled to the second piston.

* * * * *